(12) United States Patent
Broughton

(10) Patent No.: US 9,456,693 B1
(45) Date of Patent: Oct. 4, 2016

(54) SYSTEM FOR ASSEMBLING MODULAR FURNITURE

(76) Inventor: Roskear Porter Broughton, San Francisco, CA (US)

( * ) Notice: Subject to any disclaimer, the term of this patent is extended or adjusted under 35 U.S.C. 154(b) by 342 days.

(21) Appl. No.: 13/506,534

(22) Filed: Apr. 24, 2012

(51) Int. Cl.
| A47B 96/06 | (2006.01) |
| A47C 4/02 | (2006.01) |
| A47B 47/00 | (2006.01) |
| E04B 1/19 | (2006.01) |
| F16B 12/00 | (2006.01) |

(52) U.S. Cl.
CPC ............. *A47C 4/02* (2013.01); *A47B 47/0033* (2013.01); *E04B 1/19* (2013.01); *F16B 12/00* (2013.01)

(58) Field of Classification Search
CPC ...... A47C 4/02; A47C 4/021; Y10T 403/42; Y10T 403/55; F16B 12/00; F16B 12/14; F16B 12/20; F16B 12/18; F16B 12/40; E04B 1/19; A47B 47/0033
USPC ............ 248/214, 188, 220.21; 103/205, 403, 103/292, 293, 294, 295, 296, 217; 297/440.1–440.21; 403/205, 403, 292, 403/293, 294, 295, 296, 217
See application file for complete search history.

(56) References Cited

U.S. PATENT DOCUMENTS

| 3,603,546 A * | 9/1971 | Ruffert .................... F16B 12/48 248/188 |
| 3,835,354 A * | 9/1974 | Torres-Pena ....... A47B 47/0041 108/187 |
| 3,885,765 A * | 5/1975 | Richards ................ A47B 13/06 211/182 |
| 4,367,864 A * | 1/1983 | Eldeen .................. E04F 11/025 256/59 |
| 4,616,950 A * | 10/1986 | Morris .................. E04B 1/2604 256/65.07 |
| 4,883,303 A * | 11/1989 | Gross ..................... B60J 1/2005 248/300 |
| 4,903,354 A * | 2/1990 | Yeh ...................... A47C 19/022 403/292 |
| 5,826,380 A * | 10/1998 | Wolfe ...................... E04B 1/14 52/277 |
| 6,119,410 A * | 9/2000 | Wolfe ...................... E04B 1/14 16/355 |
| 6,146,047 A * | 11/2000 | Saito .................. A47B 47/0033 403/292 |
| 6,619,749 B2 * | 9/2003 | Willy ...................... A47B 3/06 108/158.12 |
| 2007/0029846 A1 * | 2/2007 | Cohen ...................... A47C 4/20 297/16.1 |
| 2010/0270843 A1 * | 10/2010 | Wang ...................... A47C 5/06 297/440.11 |

* cited by examiner

*Primary Examiner* — Christopher E Garft
(74) *Attorney, Agent, or Firm* — GSS Law Group

(57) ABSTRACT

A system for securing a plurality of structural members of a type of furniture together includes a plurality of brackets that each attach to an end of at least one of the structural members. A modified bracket permits simultaneous attachment of two or more of the structural members at an end of each of the structural members to the modified bracket. After attachment of the structural members to the modified bracket, each structural member is disposed at any desired angle with respect to a remainder of the structural members. A further modified bracket permits attachment of only one structural member end to the further modified bracket and attachment of the further modified bracket to another structural member along a longitudinal length of the other structural member. A recess provided at an end of each of the structural members receives a pair of spaced-apart longitudinal protrusions of any of the brackets.

1 Claim, 11 Drawing Sheets

SYSTEM FOR ASSEMBLING MODULAR FURNITURE

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to modular furniture and, more particularly, to a system for assembling modular furniture.

Modular furniture is well-known. The benefits are many. Modular furniture can be sold and shipped in a compact, unassembled form and assembled by the end-user, or it can also be assembled by skilled personnel and sold after assembly. A modular design provides the important advantage of being able to ship furniture in a far more compact manner than is possible with assembled furniture.

Another significant advantage of modular furniture is that various component parts can be used with variations in furniture design. This benefit applies to certain of the wood (or other material) structural members that are used and also to the component parts that are used to secure the wood (or other material) members together.

However, three general disadvantages remain for existing modular furniture designs. A first concern is maximizing strength. Certain modular furniture designs, while generally functional, exhibit weakness in the areas where structural members are fastened together. There is a need to improve the strength of the assembled furniture items.

A second concern is that most modular designs are difficult to assemble. Many end-users become confused. Complicated screw assemblies are inserted into specially drilled or router-cut openings in the structural members that baffle many people who are trying to assemble the furniture items. Much reading is required. Additionally, many component parts appear similar but are not interchangeable. There is also a need to improve clarity and ease when assembling modular furniture items.

A related additional need is to avoid having to drill or router openings at the junction points of the structural members that weaken the structural members.

A third significant area for improvement relates to appearance. The appearance of most modular furniture items instantly reveals its origins as being modular in nature. A certain lack of quality is associated with the modular, assembly line appearance common with most types of modular furniture items. There is a need to provide modular furniture that appears as if it was custom crafted. To this end artfully designed functional mounting hardware that is visually exposed, rather than hidden from view as is the teaching of prior art modular furniture designs, can be used to improve the appearance of modular furniture.

There are other long-standing needs that appertain to modular furniture designs. For example, it is desirable to secure the ends of multiple structural pieces (i.e., more than two structural members) together at one general area or point. Prior art designs struggle in both appearance and strength when more than two structural members are fastened together at one location.

Accordingly, there exists today a need for a system for assembling modular furniture that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, an improved system for assembling modular furniture would be useful and desirable.

2. Description of Prior Art

Modular furniture is, in general, known. For example, the following patent documents describe various types of these devices, some of which may have some degree of relevance to the invention. Other patent documents listed below may not have any significant relevance to the invention. The inclusion of these patent documents is not an admission that their teachings anticipate any aspect of the invention. Rather, their inclusion is intended to present a broad and diversified understanding regarding the current state of the art appertaining to either the field of the invention or possibly to other related or even distal fields of invention.

U.S. Patent Application Publication No. 2002/0136591 to Callahan, that published on Sep. 26, 2002;

U.S. Pat. No. 6,926,459 to Oakley, that issued on Aug. 9, 2005;

U.S. Pat. No. 5,685,662 to Röllin et al., that issued on Nov. 11, 1997;

U.S. Pat. No. 5,291,708 to Johnson, that issued on Mar. 8, 1994;

U.S. Pat. No. 5,116,299 to Kvols, that issued on May 26, 1992;

U.S. Pat. No. 4,676,040 to Monaghan et al., that issued on Jun. 30, 1987;

U.S. Pat. No. 4,026,084 to Goose, that issued on May 31, 1977;

U.S. Pat. No. 4,021,129 to Sykes, that issued on May 3, 1977;

U.S. Pat. No. 3,977,800 to Cassel, that issued on Aug. 31, 1976;

U.S. Pat. No. 3,968,882 to Mello, that issued on Jul. 13, 1976;

U.S. Pat. No. 3,835,354 to Torres-Pena, that issued on Sep. 10, 1994;

U.S. Pat. No. 3,791,091 to Albrizzi, that issued on Feb. 12, 1974;

U.S. Pat. No. 3,778,175 to Zimmer, that issued on Dec. 11, 1973;

U.S. Pat. No. 3,747,885 to Ciancimino, that issued on Jul. 24, 1973;

U.S. Pat. No. 3,592,493 to Goose, that issued on Jul. 13, 1971;

U.S. Pat. No. 3,525,560 to Gasner et al., that issued on Aug. 25, 1970;

U.S. Pat. No. 3,485,519 to Chiu, that issued on Dec. 23, 1969;

U.S. Pat. No. 3,159,440 to Courtwright, that issued on Dec. 1, 1964;

U.S. Pat. No. 3,008,741 to MacCormack, that issued on Nov. 14, 1961;

U.S. Pat. No. 2,962,170 to Best, that issued on Nov. 29, 1960;

U.S. Pat. No. 1,441,559 to Burhen, that issued on Jan. 9, 1923;

U.S. Pat. No. 0,660,196 to Myers, that issued Oct. 23, 1900; and

U.S. Pat. No. 154,953 to Kelley, that issued on Sep. 15, 1874.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a system for assembling modular furniture that is easy to assemble.

It is also an important object of the invention to provide a system for assembling modular furniture that provides structural integrity.

Another object of the invention is to provide a system for assembling modular furniture that is aesthetically pleasing in appearance.

Still another object of the invention is to provide a system for assembling modular furniture that includes standardized component parts.

Still yet another object of the invention is to provide a system for assembling modular furniture that permit joining of two structural members together at one location.

Yet another important object of the invention is to provide a system for assembling modular furniture that permit the joining of three, or more, structural members together at one location.

Still yet another important object of the invention is to provide a system for assembling modular furniture that includes plastic, composite, or metallic assembly components that are used to secure structural members in position.

A first continuing object of the invention is to provide a system for assembling modular furniture that includes plastic, composite or metallic assembly components that are at least partially visible after assembly.

A second continuing object of the invention is to provide a system for assembling modular furniture that includes plastic, composite or metallic assembly components that are disposed in recesses provided in the structural members.

A third continuing object of the invention is to provide a system for assembling modular furniture that includes plastic, composite or metallic assembly components that permit fastening of an end of a first structural member to an end of a second structural member.

A fourth continuing object of the invention is to provide a system for assembling modular furniture that includes plastic, composite or metallic assembly components that permit fastening of an end of a first structural member to a location along a longitudinal length of a second structural member.

A fifth continuing object of the invention is to provide a system for assembling modular furniture that includes a bracket with machine screws that are generally disposed under an upper or outer surface of the bracket and, therefore, the machine screw heads are substantially hidden from view.

A sixth continuing object of the invention is to provide a system for assembling modular furniture that includes a bracket with machine screws that are generally disposed on an upper or outer surface of the bracket and therefore, the machine screw heads are generally exposed for viewing.

Briefly, a system for assembling modular furniture that is constructed in accordance with the principles of the present invention includes a plurality of different types of brackets. If desired, fasteners and components other than the brackets may also be utilized along with the plurality of brackets. Each of the various types of brackets include at least one upper longitudinal portion and at least one opposite parallel lower longitudinal portion. The upper longitudinal portion is separated from the lower longitudinal portion by a longitudinal gap. At least one pair of upper and lower longitudinal portions are included with each bracket. The pair of upper and lower longitudinal portions of each bracket are used at every connection of the bracket to an end of a structural member (i.e., to a structural member end). If it is desired to attach the ends of two structural members (i.e., two structural member ends) to a first type of bracket, then two upper and lower longitudinal portion pairs will be included in the first bracket. Any desired angle can separate the two upper and lower longitudinal portion pairs which, in turn, will define the angle between the two structural members. For example, any acute or obtuse angle is possible between any two of the structural members. If desired, a further modified version of the first bracket can be provided that secures two of the structural members along a common center longitudinal axis (i.e., in a straight line), should that configuration be desired. Once the concept of attachment is understood virtually any desired configuration of any number of the structural members in any desired orientation with respect to each other is possible by the design of a special bracket for this purpose. Two upper holes are provided in the upper longitudinal portion of the bracket (or in the lower longitudinal portion). The upper holes allow passage (i.e., clearance) of a machine screw through each of the upper holes. A recess is provided (i.e., milled by a router or provided by other means) in an end of each structural member where the end of the structural member is to be attached to the bracket. The recess extends from a first side of the structural member beginning a predetermined distance from a structural member end, around the end of the structural member, and continuing for the predetermined distance along an opposite second side of the structural member. The structural members are formed of any preferred material including any desired type of wood, wood laminate, metal, alloy, plastic, or composite material. Two spaced apart clearance holes are provided through the structural member end in the area defined by the recess. When the bracket is properly engaged with the structural member, as described in greater detail below, the clearance holes align with the upper holes. During assembly, one of the machine screws is inserted through each of two upper holes and through each of the two clearance holes that are provided in the structural member. A pair of tapped (i.e., threaded) holes are provided in the lower longitudinal portion (or in the upper longitudinal portion) opposite the upper holes. The tapped holes do not pass entirely through the lower or upper longitudinal portion although, if specifically desired, they could thereby allowing a threaded end of one or more of the machine screws (if elongated machine screws were used) to pass through the bracket and to extend (i.e., protrude) beyond the structural member. However, this is not preferred for visual and tactile reasons and, therefore, the length of each of the machine screws is typically selected to allow sufficient engagement with the screw threads in the tapped holes but to not extend (i.e., protrude) beyond the confines of the bracket. A possible reason for allowing one or more of the machine screws to pass through the lower longitudinal portion and to protrude beyond a finished surface of the structural member would be if it was desirable to attach some other component (i.e., any desired component part of any possible furniture item) at that location. During assembly of any furniture item utilizing the system for assembling modular furniture, the bracket is fully urged over the recess at the end of each structural member. Typically, every structural member includes the recess at (at least) one end for attachment to one of the brackets; however, it is possible to include specialty structural members with certain types of furniture that may not include an attachment at either end. Instead, attachment of the specialty structural members could occur at a location other than at either opposite end of the specialty structural members. The tapped holes align concentrically with the clearance holes and with the upper holes when the structural member end is properly engaged with the bracket. The tapped holes include a thread diameter and pitch that is designed to cooperate with the machine screws. Tightening the machine screws secures the bracket to the structural member. Rather than weakening the structural member at its end, the upper and lower portions, when properly secured, provide increased strength and load carrying capacity for the structural member. The brackets, disposed in each recess, provide a smooth exterior surface at the structural member ends. The brackets can be provided in a contrasting or any desired accent color with respect to the structural members to provide a noticeable highlight and make the furniture item appear as if it were a custom-made or even a hand-made item of especially high quality. For example, brass-colored brackets when used with wood structural members can provide an especially elegant custom-made appearance. If desired, the brackets can be provided in a color and/or in material that corresponds with and, thereby, blends with the appearance of the structural members. In this manner, the brackets are inconspicuous. Different types of brackets are provided, as desired, and allow for the connection of two, three, or even more ends of the structural members simultaneously to the same modified type of bracket. In certain instances visibility of the machine screw heads used with the bracket is desirable and in other instances it is to be avoided. To accommodate this need as desired, the location of the two upper holes and the pair of tapped holes can be reversed with respect to the upper and the lower longitudinal portions to substantially control placement and, thereby, visibility of the machine screw heads. An end bracket is used to connect an end of a first structural member to a second structural member along a longitudinal length of the second structural member. A cylindrical pin is inserted in the second structural member in a bore hole that is provided in the second structural member for this purpose. The cylindrical pin includes a radially-tapped hole that receives an inner machine screw. The inner machine screw secures the end bracket at a desired location along the longitudinal length of the second structural member. The upper and lower longitudinal ends of the end bracket are used to connect the end bracket to an end of the first structural member in the manner previously described. The brackets are formed of any preferred material including any desired metal, alloy, plastic, or composite material.

DETAILED DESCRIPTION OF THE INVENTION

Figure 1:
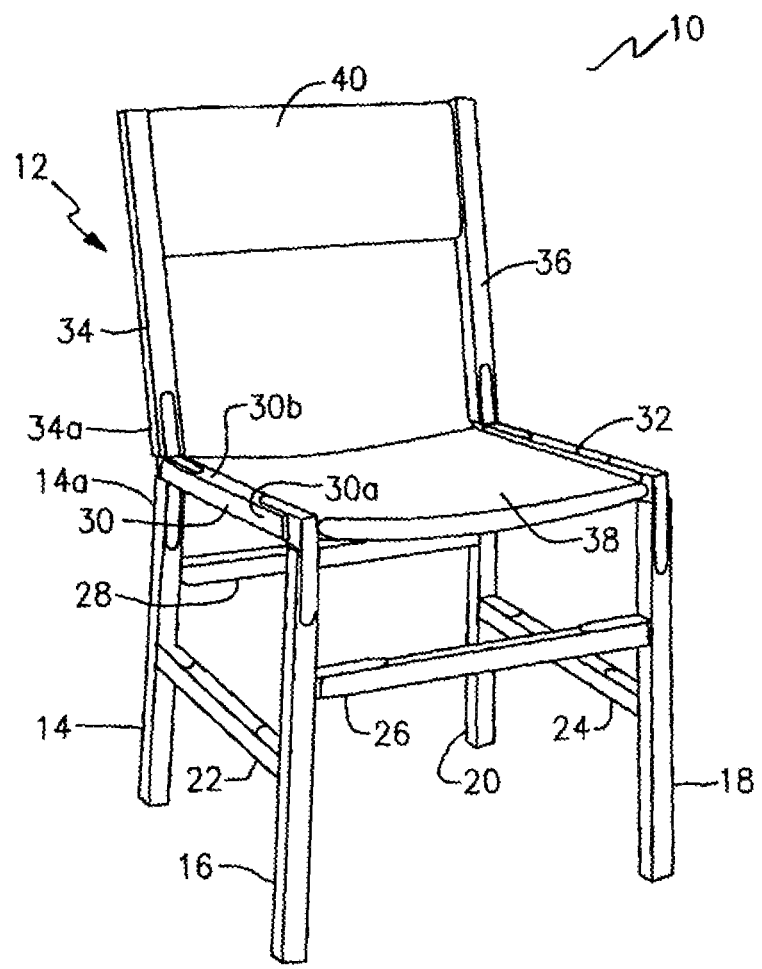
FIG. 1 is a view in perspective of an assembled modular chair using a system for assembling modular furniture.

Referring on occasion to all of the FIGURE drawings and now, in particular to FIG. 1, is shown a system for assembling modular furniture, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

A first chair, identified in general by the reference numeral 12, is shown in a fully assembled state utilizing the system for assembling modular furniture 10. The first chair 12 includes a first structural member 14, a second structural member 16, a third structural member 18, a fourth structural member 20, a fifth structural member 22, a sixth structural member 24, a seventh structural member 26, an eighth structural member 28, a ninth structural member 30, a tenth structural member 32, an eleventh structural member 34, and a twelfth structural member 36.

The first structural member 14, the second structural member 16, the third structural member 18, and the fourth structural member 20 provide the four generally vertical legs of the first chair 12.

The fifth structural member 22, the sixth structural member 24, the seventh structural member 26, and the eighth structural member 28 provide four generally horizontal leg cross-braces that help support the legs (14-20) and secure them in the desired position.

The ninth structural member 30 and the tenth structural member 32 provide a pair of generally horizontal (or slightly angled) side supports that are disposed on opposite sides of a seat 38. The seat 38 is secured to the side supports (i.e., to the ninth structural member 30 and the tenth structural member 32) by any preferred method. The seat 38 may be formed of a flexible fabric material or any other material (flexible or not) that is suitable for the purpose.

The eleventh structural member 34 and the twelfth structural member 36 provide a pair of generally vertical (or slightly angled) rear supports that are disposed on opposite sides of a backrest 40. The backrest 40 is secured to the rear supports (i.e., to the eleventh structural member 34 and the twelfth structural member 36) by any preferred method. The backrest 40 may be formed of a flexible fabric material or any other material (flexible or not) that is suitable for the purpose.

The structural members 14-36 are formed of any desired material including any species of wood, wood laminate, wood or wood-based composition product, metal or alloy, plastic or composite material.

The first chair 12 includes twelve brackets, each identified by one of the following reference numerals: 42, 44, 46, 48, 50, 52, 54, 56, 58, 60, 62, 64. The brackets 42-64 are described in greater detail, hereinafter.

Figure 2:
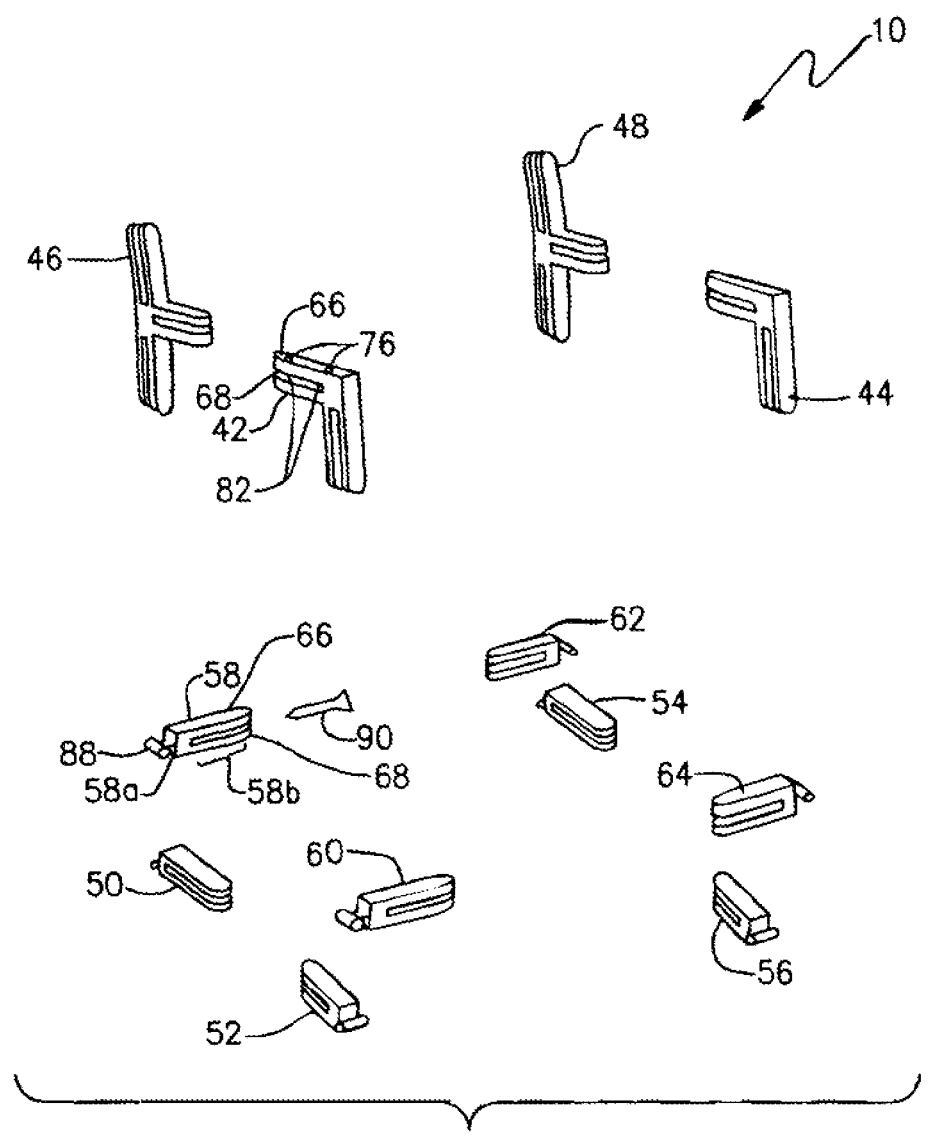
FIG. 2 is a view in perspective of a plurality of brackets disposed in space in their relative positions, absent the structural members and the seat and the backrest of the chair of FIG. 1.
Figure 3:
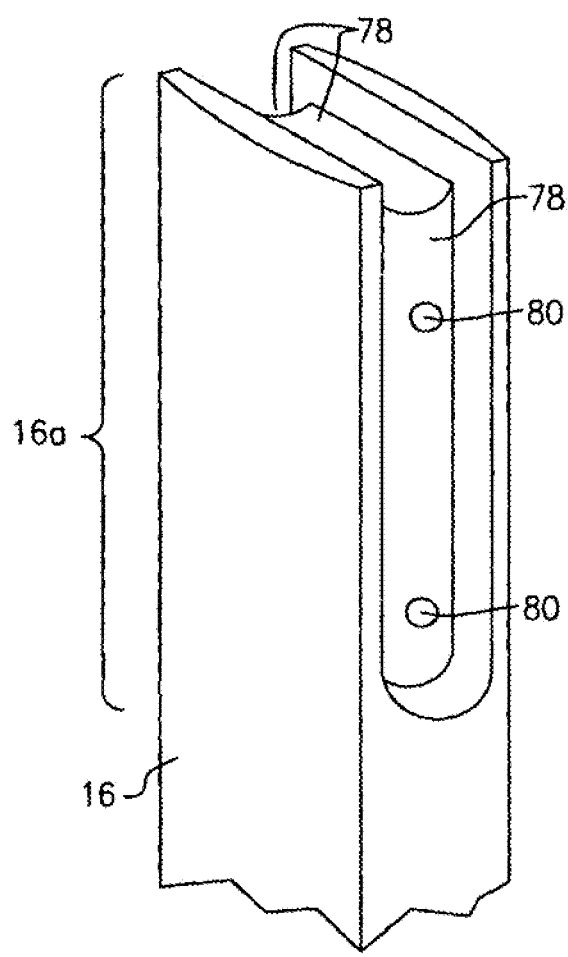
FIG. 3 is a view in perspective showing detail of a structural member end of the chair of FIG. 1.
Figure 4:
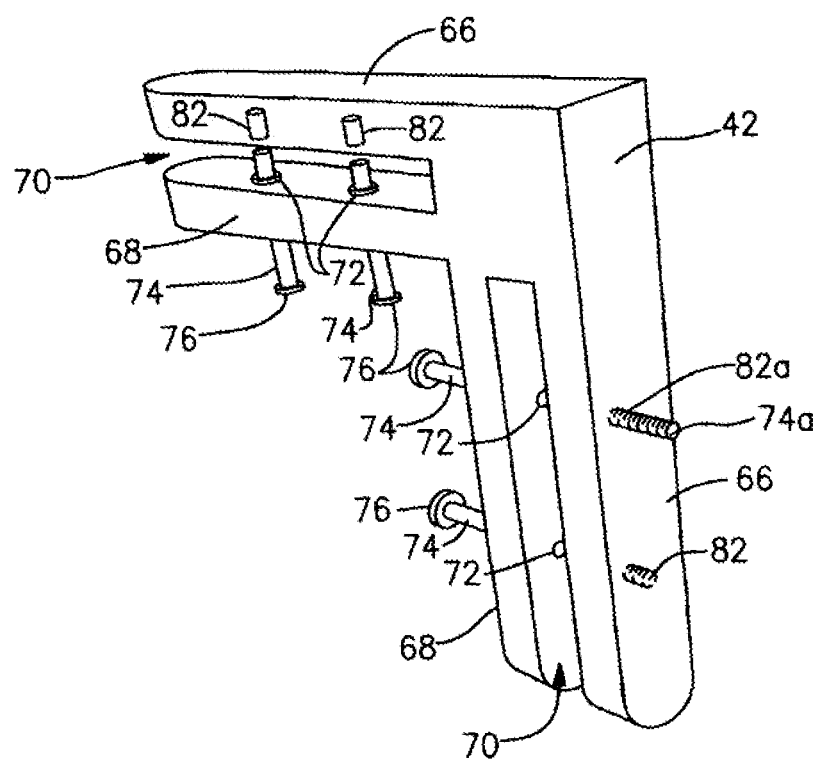
FIG. 4 is a view in perspective showing detail of an L-shaped first bracket of the chair of FIG. 1 with a plurality of machine screws disposed on either bottom or inside surfaces to hide the machine screw heads from view if an outside corner of the L-shaped first bracket is visible.

Referring now to FIG. 2 the brackets 42-64 are disposed in three-dimensional space, with each bracket 42-64 in its corresponding relative positions as appearing on the assembled first chair 12.

Among the brackets 42-64 are included a first L-shaped first bracket 42 and an identical second L-shaped first bracket 44. Refer also to FIGS. 3-6 and to FIG. 9 during discussion of the first and second L-shaped first brackets 42, 44.

Figure 5:
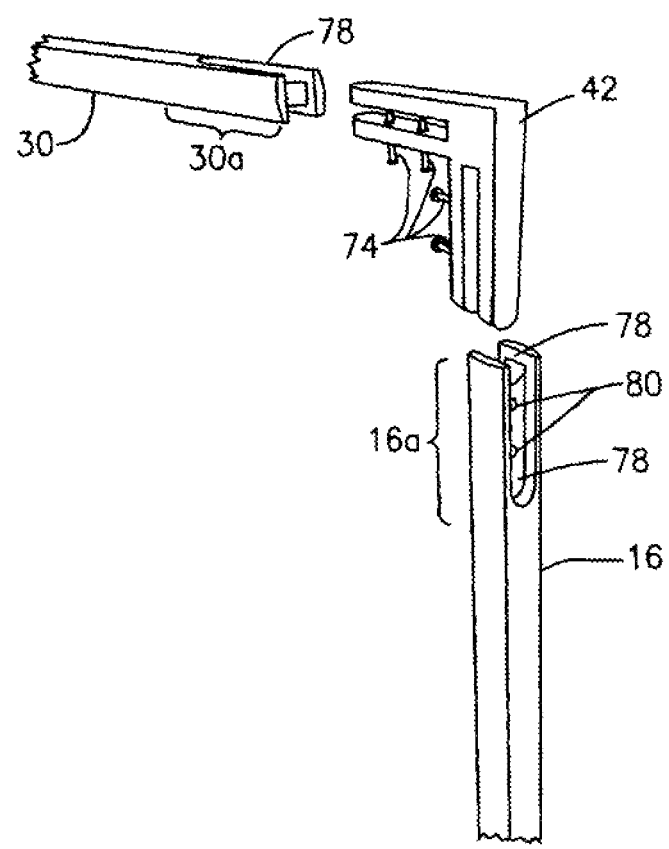
FIG. 5 is an exploded view in perspective showing detail of the L-shaped first bracket of FIG. 4 with a partial view of two of the structural members of the chair of FIG. 1 shown in position with respect to the L-shaped first bracket prior to assembly.
Figure 6:
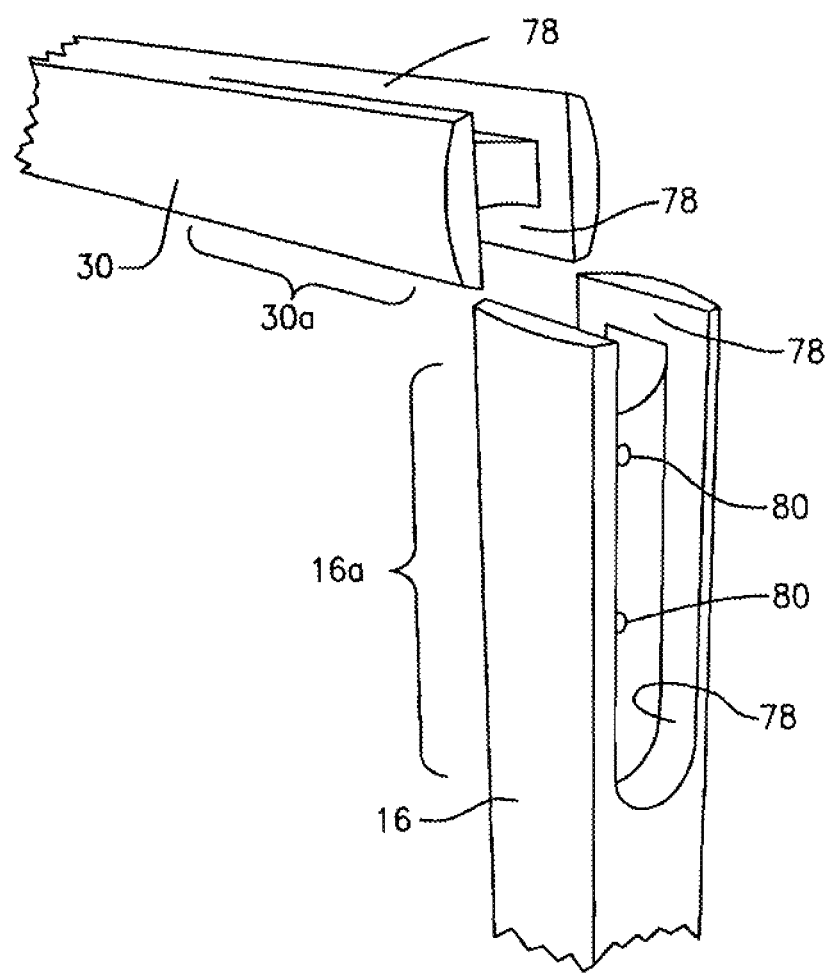
FIG. 6 is a view in perspective showing detail of the two structural members of FIG. 5 shown in their proper assembled position with respect to each other, absent the L-shaped first bracket.

The first L-shaped first bracket 42 is attached to a first structural member end, as shown by bracket 16a (See FIGS. 3, 5, and 6), of the second structural member 16 and to a first structural member end, as shown by bracket 30a, of the ninth structural member 30 (See also FIGS. 5 and 6).

Each of the various types of brackets 42-64 include at least one upper (or outer) longitudinal portion 66 (See FIG. 4) and at least one opposite parallel lower (or inner) longitudinal portion 68. The upper longitudinal portion 66 is separated from the lower longitudinal portion 68 by a longitudinal gap, identified in general by the reference numeral 70. At least one pair of the upper and lower longitudinal portions 66, 68 are included with each inventive bracket 42-64 when it is desirable to attach an end portion of any one of the structural members 14-36 to the inventive bracket 42-64.

When it is desirable to attach the end portion of two of the structural members 14-36 to the same bracket 42-64, then the bracket 42-64 is modified to include two pairs (or two sets) of the upper and lower longitudinal portions 66, 68 with the modified bracket. When it is desirable to attach the end portion of three of the structural members 14-36 to the same bracket 42-64, then the bracket 42-64 is further modified to include three pairs (or three sets) of the upper and lower longitudinal portions 66, 68 with the further modified bracket. If the ends of four or more structural members 14-36 were to be attached to a specially modified bracket 42-64 (not shown in any of the illustrated furniture items but possible for other types of furniture items) then additional pairs (or sets) of the upper and lower longitudinal portions 66, 68 would be included, as desired, with the specially modified bracket 42-64.

The pair of upper and lower longitudinal portions 66, 68 of each bracket 42-64 are used at each connection of any one of the brackets 42-64 to an end of any of the structural members 14-36 (i.e., whenever connection to any structural member end 16a, 30a occurs).

Many different types of brackets 42-64 are certainly possible, a few of which are illustrated and described in the specification sufficient to allow anyone of ordinary skill to readily further modify the brackets 42-64, as shown, for use with other types of furniture items (not shown).

However, as previously mentioned all of the inventive brackets 42-64 share in common the inclusion of at least one of the upper longitudinal portions 66 and at least one of the opposite lower longitudinal portions 68 separated by the gap 70 for attachment to an end of any of the structural members 14-36. As desired, specialty hardware (not shown) may also be designed and included for attachment to any of the structural members 14-36 for any intended purpose. The specialty hardware is not used to provide structural support to any of the structural member 14-36 ends. Therefore, the specialty hardware does not include any of the paired upper and lower longitudinal portions 66, 68.

Referring again primarily to FIG. 4, two machine screw holes 72 are provided in each of the lower (or inside) longitudinal portions 68 of the first L-shaped first bracket 42. Each of the machine screw holes 72 allows passage (clearance) of a machine screw 74 there-through.

Figure 9:
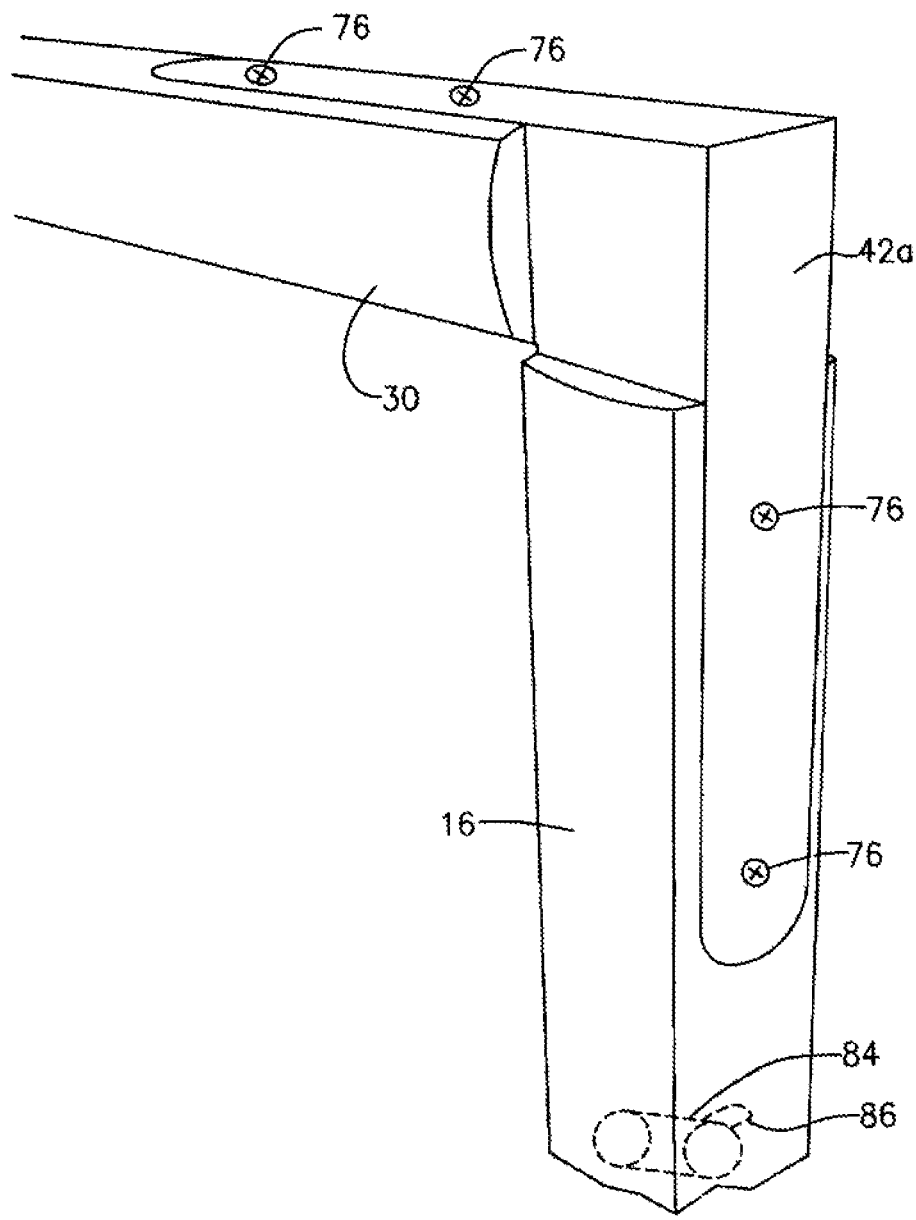
FIG. 9 is a view in perspective showing detail of the L-shaped first bracket and the two structural members of FIG. 1 after attachment of the two structural members to the L-shaped first bracket with a modification to the L-shaped first bracket that includes a plurality of machine screws disposed on either an upper or an outside surface to allow viewing of the machine screw heads if an outside corner of the L-shaped first bracket is visible.

Referring now momentarily to FIG. 9, is shown a slightly modified version of the first L-shaped first bracket 42a. The two machine screw holes 72 are provided in each of the upper (or outer) longitudinal portions 66 of the modified first L-shaped first bracket 42a.

If an outside corner 42b of either the first L-shaped first bracket 42 or the modified first L-shaped first bracket 42a is generally visible after assembly of the desired furniture item, the location of the machine screw holes 72 affect visibility of a machine screw head 76 of each of the machine screws 74. If visibility of the machine screw heads 76 is desired, the modified first L-shaped first bracket 42a is used. If visibility of the machine screw heads 76 is not desired, the first L-shaped first bracket 42 is, instead, used.

A perimeter end recess 78 (See FIG. 3 and FIG. 6) is provided around the first, structural member end 16*a* of the second structural member 16 and around the first structural member end 30*a* of the ninth structural member 30. The perimeter end recess 78 can be milled using a numerically controlled machine (not shown), a router or by any preferred means. If desired, the perimeter end recess 78 can be molded into any desired end of any of the structural members 14-36 if the material used to form the structural members 14-36 permits such molding.

The ninth structural member 30 also includes a second structural member end 30*b* of the ninth structural member 30 that is structurally identical with respect to the first structural member end 30*a* of the ninth structural member 30. The second structural member end 30*b* of the ninth structural member 30 is disposed at an opposite end of the ninth structural member 30 with respect to the first structural member end 30*a* of the ninth structural member 30.

Accordingly, the second structural member end 30*b* of the ninth structural member 30 also includes a second perimeter end recess 78 at the second structural member end 30*b* of the ninth structural member 30 because the second structural member end 30*b* of the ninth structural member 30 is also attached to one of the brackets 42-62, in particular, to a midpoint of a first triple bracket 46 type of the brackets 42-62. A substantially identical second triple bracket 48 (i.e., a mirror image that may include an opposite splay angle for the legs) is also provided as one of the brackets 42-62. The first and second triple brackets 46, 48 are discussed in greater detail, hereinafter.

Two clearance holes 80 are provided in each of the perimeter end recesses 78 and provide clearance to allow passage of a shaft portion of the machine screws 74 therethrough.

A pair of tapped (i.e., threaded) holes 82 (shown in dashed lines, FIG. 4) are provided in either the upper or lower longitudinal portions 66, 68 of each bracket 42-64 opposite that portion that includes the machine screw holes 72. The tapped holes 82 do not pass entirely through the upper or lower longitudinal portions 66, 68 although, if specifically desired, they could pass through the upper or lower longitudinal portions 66, 68 (not shown), thereby allowing a threaded end of one or more of the machine screws 74 (if a longer version of the machine screws 74—not shown, was used) to pass through and protrude from the respective bracket 42-64.

If a longer version of the machine screw 74 was used and if the tapped holes 82 were modified to pass through the bracket 42-64 the threaded end of the longer machine screw 74 would also extend (i.e., protrude) beyond an exterior surface plane of the respective structural member 14-36. However, this is generally not preferred for visual and tactile reasons and, therefore, the length of each of the machine screws 74 is typically selected to allow sufficient engagement with the tapped holes 82 but to not extend (i.e., protrude) beyond the confines of the bracket 42-64. A possible reason for allowing one or more of the machine screws 74 to protrude beyond a finished surface of the structural member 14-36 would be if it was desirable to attach some other component (i.e., any desired component part of the furniture item—not shown) at that location.

The tapped holes 82 align concentrically with the clearance holes 80 and with the machine screw holes 72 when the first structural member end 16*a*, 30*a* is properly engaged with the first L-shaped first bracket 42 or with any of the remaining brackets 44-64. The tapped holes 82 include a thread diameter and pitch that is designed to cooperate with the machine screws 74.

The perimeter end recess 78 of the second structural member 16 is urged into the gap 70 of the lower portion of the first L-shaped first bracket 42. The perimeter end recess 78 of the ninth structural member 30 (that is disposed at the first structural member end 30*a* of the ninth structural member 30) is urged into the gap 70 of the upper portion of the first L-shaped first bracket 42.

After properly urging the first structural member ends 16*a* 30*a* of the second and ninth structural members fully with the first L-shaped first bracket 42, one of the machine screws 74 is inserted in each of the machine screw holes 72, through the machine screw clearance hole 80, and is engaged with the tapped hole 82 by tightening of the machine screw 74.

Tightening the machine screws 74 secures the first L-shaped first bracket 42 to the second and ninth structural members 16, 30. Rather than weakening the structural members 16, 30, the first L-shaped first bracket 42, working in cooperation with the perimeter end recesses 78, provide increased strength and load carrying capacity for the structural members 16, 30.

The first L-shaped first bracket 42, disposed in the two perimeter end recesses 78, provides a smooth exterior surface at the structural member 16, 30 ends (16*a*, 30*a*) that is preferably disposed on the same plane as an exterior surface of the structural members 16, 30. If desired, an offset can also be included.

The second L-shaped first bracket 44 is similarly secured to the third structural member 18 and to the tenth structural member 32.

The brackets 42-64 can be provided in a contrasting or any desired accent color with respect to the structural members 14-36 in order to provide a noticeable highlight. This helps to make the furniture item (i.e., the first chair 12) appear as if it were a custom-made or even a hand-made item of especially high quality. For example, brass or brass-colored brackets 42-64 when used with wood structural members 14-36 can provide an especially elegant custom-made appearance.

If desired, the brackets 42-64 can be provided in a color and/or in material that corresponds with and, thereby, blends with the appearance of the structural members 14-36. In this manner, the brackets 42-64 are inconspicuous. Considerable design flexibility is provided by the system for assembling modular furniture 10. For example, some of the brackets 42-64 may include an accent color to increase their visibility on certain furniture items while a remainder of the brackets 42-64 may include a matching color to decrease their visibility. Similarly, certain of the machine screw heads 76 may be concealed underneath portions of the first chair 12 (or other furniture item) while certain other machine screw heads 76 may be shown on exposed exterior surfaces of the first chair 12 to increase their visibility, as desired.

Referring momentarily to FIG. 2 and also to FIG. 1 the first triple bracket 46 is used to secure the second structural member end 30*b* of the ninth structural member 30, a lower end 34*a* of the eleventh structural member 34, and an upper end 14*a* of the first structural member 14, thereto. The second triple bracket 48 similarly secures the fourth structural member 20, the tenth structural member 32, and the twelfth structural member 36, thereto.

A plurality of end brackets 50-64 (FIG. 2) are used with the first chair 12. Each of the end brackets 50-64 is used to connect an end of certain of the structural members 22, 24, 26, 28 to one or two of certain of the structural members 14, 16, 18, 20 along a longitudinal length (i.e., not at an end) of one or two of certain of the structural members 14, 16, 18, 20, as shown in FIG. 1. The end brackets 50-64 allow attachment to occur at a location that is not at an end of certain of the structural members 14, 16, 18, 20.

Where attachment to certain of the structural members 14, 16, 18, 20 along a longitudinal length of the structural members 14, 16, 18, 20 is to occur, a bore hole 84 (See FIG. 9, shown in dashed lines) is provided along a longitudinal length of the structural members 14, 16, 18, 20 at a location where attachment of one of the other structural members 22-28 is to occur. The bore hole 84 begins at one side of each of the structural members 14-20 and extends a predetermined amount into each of the structural members 22-28. For aesthetic reasons the bore hole 84 does not typically pass through the structural member 22-28.

Each bore hole 84 includes a side hole 86 that is perpendicular with respect to a center longitudinal axis of the bore hole 84. The side hole 86 connects with the bore hole 84 and extends to a surface of the structural member 22-28. The side hole 86 is preferably disposed at a center of the structural member 22-28.

A cylindrical pin 88 (FIG. 2) includes an outside diameter that is slightly less than the inside diameter of the bore hole 84. The cylindrical pin 88 includes a second tapped hole 89 (See modified cylindrical pin 400 of FIG. 11 which also includes the [same] second tapped hole 89 as does the cylindrical pin 88). The second tapped hole 89 is perpendicular with respect to a center longitudinal axis (comparable to a center longitudinal axis of the modified cylindrical pin 400 of FIG. 11, as shown by dashed line 88a).

One of the cylindrical pins 88 is inserted in each of the bore holes 84 that are provided for this purpose in the structural members 14-20. When properly inserted, the second tapped hole aligns with the side hole 86.

The second tapped hole includes screw threads that are designed to cooperate with an inner machine screw 90 (shown in an exploded view FIG. 2). The inner machine screw 90 passes through an inner machine screw opening 90a that is provided in a distal end (as identified by reference numeral 58a of FIG. 2 and FIG. 11) of each of the end brackets 50-64. The inner machine screw 90 of one of the end brackets 58 is tightened to secure the end bracket 58 to the first structural member 14 where desired along the longitudinal length of the first structural member 14. When tightened, the inner machine screw 90 also secures the cylindrical pin 88 in one of the two bore holes 84 provided in the first structural member 14. Each of the remaining end brackets 50-56 is similarly secured where desired to one of the respective structural members 14-20 that form the legs of the first chair 12. See also FIG. 9 for attachment of another one of the end brackets 60 (the end bracket 60 is not shown in FIG. 9) to the second structural member 16.

An opposite end (as identified by bracket 58b of FIG. 2) of each of the end brackets 50-64 with respect to the distal end 58a includes one set of the upper or lower longitudinal portions 66, 68. The upper or lower longitudinal portions 66, 68 of each of the end brackets 50-64 are used to attach the opposite end 58b of each of the end brackets 50-64 to an end of one of the respective structural members 22-28 that provide the four generally horizontal leg cross-braces.

For example, the perimeter recess 78 disposed at an end of the eighth structural member 28 is urged into proper engagement with the upper or lower longitudinal portions 66, 68 of the end bracket 58. The two machine screws 74 are inserted and tightened. An opposite side of the eighth structural member 28 is similarly secured to the fourth structural member 20 (leg) by use of end bracket 62.

The remaining one of the bore hole 84 in the first structural member 14 is used to secure an end of the fifth structural member 22 to the first structural member 14 at an angle that is generally perpendicular with respect to the eighth structural member 28. Both ends of each of the structural members 22-28 that form the four generally horizontal leg cross-braces are similarly secured to each of the structural members 14-20 that form the legs. In this way the legs are adequately braced.

A lower portion of the second triple bracket 48 secures an upper portion of the fourth structural member 20 thereto. An upper portion of the second triple bracket 48 secures a lower portion of the twelfth structural member 20 thereto. As mentioned previously, the backrest 40 is secured by any preferred means intermediate the eleventh structural member 34 and the twelfth structural member 36. Similarly, the seat 38 is secured by any preferred means intermediate the ninth structural member 30 and the tenth structural member 32 to complete assembly of the first chair 12.

Easy-to-follow instructions are provided that allow an end-user to readily assemble the first chair 12. The first chair 12, when assembled, is strong and attractive. The brackets 42-64 in concert with the structural members 14-36 provide a pleasant appearance that appears more as if it were custom-made, rather than modular.

Numerous benefits are provided by the system for assembling modular furniture 10. The structural members 14-36, the brackets 42-64, the cylindrical pins 88, the machine screws 74, and the inner machine screws 90 can be shipped in a compact shipping container (not shown).

An important unexpected benefit of ease of assembly is provided by the brackets 42-64 that each include at least one set of the upper and lower longitudinal portions 66, 68. The end-user who typically assembles the first chair 12 quickly masters the procedure for attaching the ends of each of the structural members 14-36 to the brackets 42-64.

Attachment of each structural member 14-36 end is simple and quick as only two machine screws 74 need be inserted at each structural member 14-36 end. In additional to being easy to accomplish, once understood, the end-user quickly realizes that mere repetition is all that is required to attach all of the structural member 14-36 ends to the respective brackets 42-64.

The only change to this pattern occurs when an end of one of the structural members 22-28 is attached between the ends of certain of the structural members 14-20 (i.e., to the legs). That change requires the insertion of one of the cylindrical pins 88 inside each of the bore holes 84. A marking can be included on the cylindrical pins 88 to facilitate proper orientation of the cylindrical pin 88 in the bore hole 84. A plug (not shown) is preferably applied over the exposed end of the bore hole 84 to conceal the bore hole 84 after assembly of the first chair 12 is complete.

Minimal assembly by the end-user is required, and the patterns of assembly are simple, quick, easy to accomplish, and highly repetitious.

Additionally, very few different types of component parts are used. Accordingly, this greatly helps to lessen or even eliminate the possibility of errors in assembly from occurring.

An important benefit provided by the system for assembling modular furniture 10 is that the brackets 42-64 can be used (depending on the material selected) to actually help to increase strength of connection to the ends of the structural members 14-36. With prior art types modular furniture systems (not shown), the fasteners used tend to weaken the ends of the members. By improving strength, the system for assembling modular furniture 10 allows for lighter weight structural members 14-36 for any given load-rating for the first chair.

Figure 7:
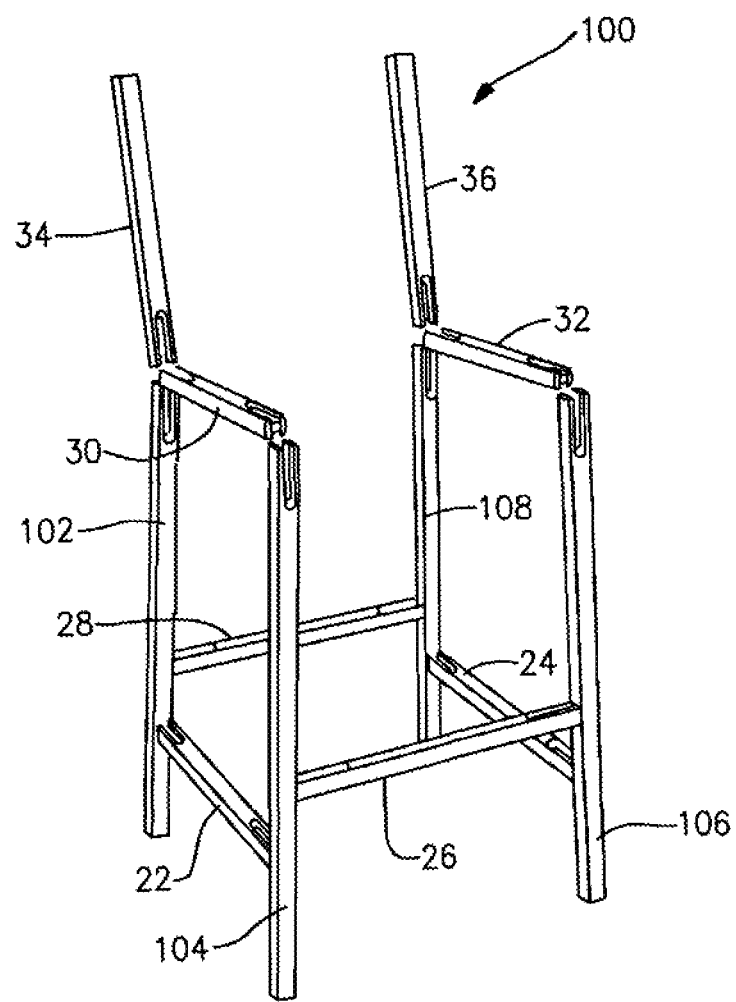
FIG. 7 is a view in perspective of the structural members of a first modified chair absent the brackets, which would use the same brackets as the chair of FIG. 1, the only substantive difference being the inclusion of four longer legs, in order to illustrate some of the versatility and economy of construction provided by the system for assembling modular furniture.

Another important benefit provided by the system for assembling modular furniture 10 relates both to versatility and a resultant economy that occurs. For example, referring now to FIG. 7 is shown a first modified chair, identified in general by the reference numeral 100 absent the seat 38 and the backrest 40. The perspective view includes several of the structural members 22-36 that are identical to those used with the first chair 12.

The first modified chair 100 includes four leg members 102, 104, 106, 108 that are longer than the structural members 14-20 (i.e., the legs) of the first chair 12. The result is that, aside from the leg members 102-108, all of the same component parts are used with the first modified chair 100 as are used with the first chair 12. Yet, an entirely different type of furniture item is provided. The first modified chair 100 provides a type of high-chair that can be used at bars or for eating from extended countertops that are found in many kitchens. This economy extends even to the instructions which, again aside from illustrating the longer leg members 102-108 of the first modified chair 100, are identical to the instructions provided with the first chair 12.

Figure 8:
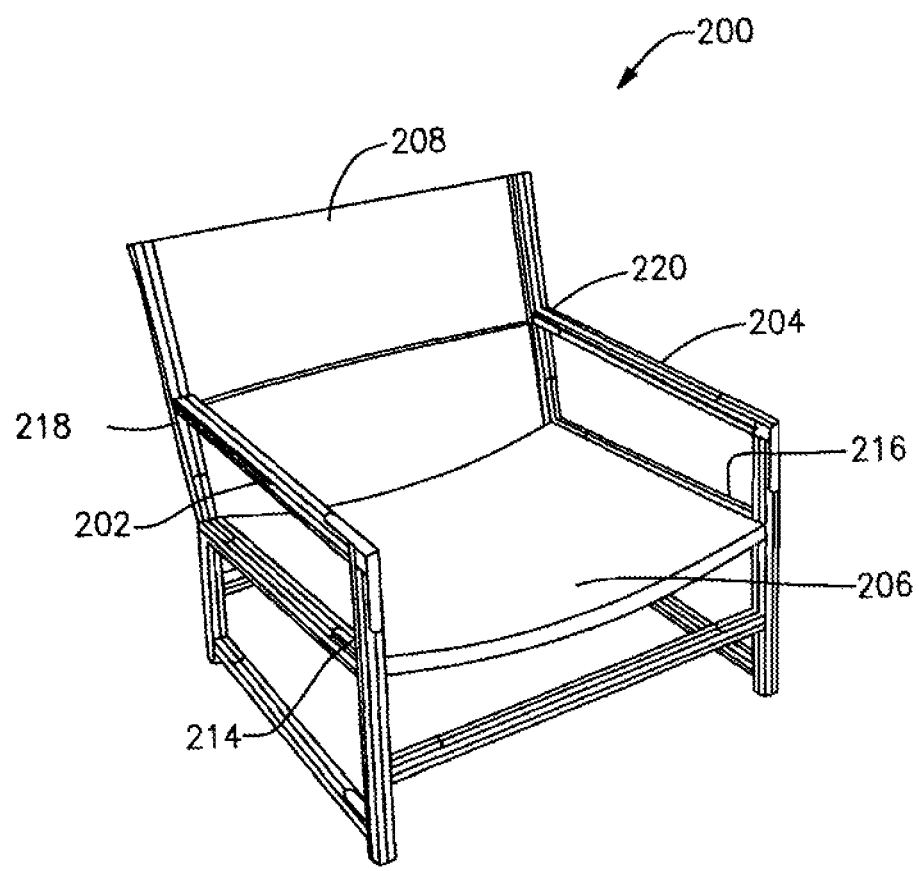
FIG. 8 is a view in perspective of an assembled second modified chair that is similar to the chair of FIG. 1, the only substantive differences being the inclusion of a pair of arm rests and a wider seat and a wider backrest, further illustrating the versatility and economy of construction provided by the system for assembling modular furniture.

Referring now to FIG. 8 is shown a second modified chair, identified in general by the reference numeral 200. The second modified chair 200 is similar to the first chair 12. However, the second modified chair 200 includes a pair of arm rests 202, 204 and a wider modified seat 206 and a wider modified backrest 208. The second modified chair 200 can be used to accommodate larger people. If preferred, the second modified chair 200 can be used to accommodate two normal sized people and thereby function as a type of furniture item generally referred to as a "love seat". Additionally, a taller set of front legs 210, 212 are included with the second modified chair 200. Four additional end brackets 214, 216, 218, 220 are also included with the second modified chair 200.

Accordingly, the second modified chair 200 further helps to illustrate how minor variations in design can be used to provide substantially different types of furniture items while still utilizing the same brackets 42-64 in varying quantities and with slight changes and additions to the original structural members 14-36 of the first chair 12.

After having had benefit of this disclosure, numerous other variations in the style and type of furniture items that can be provided by utilizing the system for assembling modular furniture 10 are possible and are limited primarily only by the imagination of the designer. For example, the assembly of couches, beds, tables, chests of drawers and other types of furniture are possible utilizing the system for assembling modular furniture 10. Accessory items, such as novel lamps can also be made by use of the system for assembling modular furniture 10. In this manner, the same look, or aesthetic, can be captured for an entire furniture and accessory ensemble.

For example, every structural member 14-36 typically includes the recess at (at least) one end for attachment to one of the brackets; however, it is possible to include specialty structural members (not shown) with a novel furniture design that may not include an attachment at either end. Instead, attachment of the specialty structural members could occur at a location other than at either end of the specialty structural members. For example, an additional quantity of the end brackets 50-64 could be used along a longitudinal length of the specialty structural members to secure the specialty structural members in position on the novel furniture design.

Other changes to the brackets 42-64 are also possible. As previously mentioned it is possible to modify any of the brackets 42-64, if desired, to include a machine screw distal hole (82a, FIG. 4) on the same side as the tapped hole 82 if a longer version of the machine screw 74 is to be used. This would allow a threaded end portion 74a of the longer version of the machine screw 74 to protrude beyond the exterior surface of the bracket 42-64. The threaded end portion 74a could then be used with a nut and washer (not shown) to secure any desired item at that location.

Referring again to FIG. 1, it is important to note that the eleventh structural member 34 is not in longitudinal alignment with the first structural member 14 and the twelfth structural member 36 is not in longitudinal alignment with the fourth structural member 20. As it is generally regarded as more comfortable to angle the backrest 40 rearward, the first and second triple brackets 46, 48 introduce the desired rearward angle to the eleventh and twelfth structural members 34, 36, and therefore also to the backrest 40.

Additionally, the fourth structural member 20 is not necessarily disposed on the same vertical plane as is the twelfth structural member 36. The fourth structural member 20 can splayed outward so that the bottom of the fourth structural member 20 is disposed a greater distance away from the bottom of the first structural member 14 than it is from the top of the first structural member 14. Similarly, as desired, the bottom of the fourth structural member 20 can be disposed a greater distance away from the bottom of the third structural member 18 than it is from the top of the third structural member 18.

Accordingly, the first and second triple brackets 46, 48 can be used to introduce any angular offset in any of three directions to the structural members 14, 30, 34, 20, 32, 36 that are attached, thereto. Similarly, any of the brackets 42-64 can be used to introduce any desired offset or angle between any of the structural members 14-36.

The first chair 12 (or any furniture item that utilizes the system for assembling modular furniture 10) is preferably sold as a kit with all of the component parts shipped in a disassembled state. The structural members 14-36 would have include the recess 78 and the clearance holes 80 already included at every structural member 14-36 end that is to be attached to any of the brackets 42-64. The end-user then assembles the first chair 12 (or any furniture item) by following the enclosed instructions. Of course, any type of furniture item that utilizes the system for assembling modular furniture 10 may be assembled prior to its sale and then sold in an assembled state, if desired.

A preferred method of assembly, as previously described, includes the use of the machine screws 74, the machine screw holes 72, the machine screw clearance holes 80, and engagement of the machine screws 74 with the tapped holes 82 to secure the structural members 14-36 to the various brackets 42-64. However, it is to be understood that other types of fasteners may also be used.

For example, bolts or hex screws or any other threaded type of fastener can be used in place of the machine screws 74. Similarly, other currently known or future fastening methods and devices may similarly be used instead of the machine screws 74 and the tapped holes 82. For example, cam-lock fasteners or bayonet types of fasteners can be used instead of the machine screws 74. If the cam-lock or bayonet fasteners are used, then a corresponding mating receptacle is used in place of each of the tapped holes 82 to engage with the cam-lock or bayonet fasteners. As may be necessary, the machine screw holes 72 and the machine screw clearance holes 80 may be adjusted in size or shape (i.e., profile) to cooperate with the cam-lock or bayonet fasteners or any other type of fastening device. The tapped holes or the mating receptacles provide a means for securing a distal end of any desired type of fastening device, thereto.

Other modifications are also possible. While it is possible to use only one machine screw 74 (or other type of fastener) the use of two machine screws 74 at each upper and lower longitudinal portion 66, 68 pair is preferred because the use of two machine screws 74 provides a better clamping action by the upper longitudinal portion 66 and the lower longitudinal portion 68 to the structural member 14-36.

If desired, more than two machine screws 74 (or other fasteners) may be used at each upper and lower longitudinal portion 66, 68 pair. The longitudinal length of the upper and lower longitudinal portions 66, 68 can also be increased or decreased, as desired.

The brackets 42-64 of the system for assembling modular furniture 10 also provide another significant and unexpected benefit. Stress is transferred away from the outermost distal ends of the structural members 14-36. Accordingly, when a load (i.e., stress) is applied to any of the structural members 14-36, there is less likelihood of cracking or splitting of the structural members 14-36 occurring at the distal ends, thereof.

This is due, largely, to two primary reasons. A first reason is that the clamping action provided by the brackets 42-64 of the system for assembling modular furniture 10 provides exceptional strength and rigidity by distributing stress over the longitudinal length of the upper and lower longitudinal portions 66, 68, thereby eliminating weak points.

A second reason is due to the fact that the outermost machine screw 74 of each of the brackets 42-64 is disposed a greater distance away from the outermost distal ends of the structural members 14-36 than would occur if a prior art fastening method for the assembly of modular furniture was utilized. The greater distance from the end of the structural member 14-36 that is provided by the system for assembling modular furniture 10 increases the amount of grain (if wood is used) between the distal end of the structural member 14-36 and the location of the first machine screw 74 that passes through the structural member 14-36.

This helps to prevent "short graining". Short graining is a term used in the woodworking arts to refer to a condition when an insufficient length of wood grain in a wood structural member results in an inherent structural weakness. The additional length of distance between a distal end of the structural member 14-36 and the machine screw 74 also provides increased structural strength to the structural member 14-36 regardless of the material that is used to form the structural member 14-36.

Figure 10:
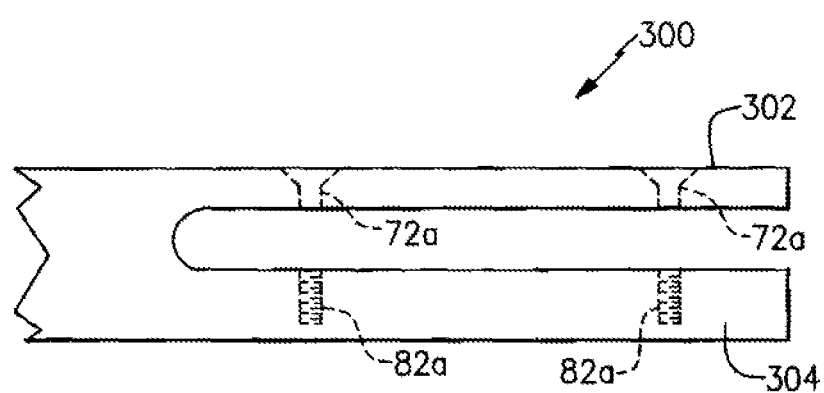
FIG. 10 is a side view of an end portion of a first modified offset bracket.

Referring now to FIG. 10 is shown an end portion of a first modified offset bracket, identified in general by the reference numeral 300. The remainder of the first modified offset bracket 300 (i.e., the portion that is not shown) may resemble that of any of the brackets 42-64 or of any specialty bracket (not shown) except that it would include the modifications, thereto, as described hereinbelow.

The first modified offset bracket 300 includes a modified upper longitudinal portion 302 and a modified lower longitudinal portion 304. When compared to any comparably-sized bracket 42-64, the modified upper longitudinal portion 302 of the first modified offset bracket 302 is thinner than the upper longitudinal portion 66 and the modified lower longitudinal portion 304 is thicker than the lower longitudinal portion 68.

Accordingly, the modified upper longitudinal portion 302 includes one or more modified machine screw holes 72a that are shorter than the previously described comparable machine screw holes 72. Similarly, the modified lower longitudinal portion 304 includes one or more modified tapped holes 82a that are longer than the previously described comparable tapped holes 82.

A primary purpose of this modification is to provide the longer modified tapped holes 82a. The longer modified tapped holes 82a provide a greater thread depth which facilitates tightening of the machine screws 74 by providing greater engagement strength for the screw threads disposed at the distal end of the machine screws 74. The longer (i.e., deeper) modified tapped holes 82a also provide ample clearance for tightening of the machine screws 74 as the longer modified tapped holes 82a prevent bottoming-out of the distal ends of the machine screws 74 in the modified lower longitudinal portion 304.

Because the modified upper longitudinal portion 302 and the modified lower longitudinal portion 304 are not of the same thickness they are not symmetrical.

When the first modified offset brackets 300 are used, then a plurality of modified structural members (not shown) are provided that each include at least one modified perimeter end recess (not shown). The modified perimeter end recess is provided in place of the perimeter end recess 78. The modified perimeter end recess is shallower where engagement with the modified upper longitudinal portion 302 occurs and is deeper where engagement with the modified lower longitudinal portion 304 occurs.

This is done to ensure that the outer surfaces of the modified upper longitudinal portion 302 and the modified lower longitudinal portion 304 are disposed on the same plane as the outer surfaces of the modified structural members after assembly, which provides a smooth transition from the surface of the modified structural member to the surface of the first modified offset bracket 300. As previously mentioned, any desired offset can also be included, if desired.

However, an important unexpected benefit is also provided by this configuration. The modified structural members cannot be improperly assembled (i.e., upside down) with respect to the first modified offset bracket 300 without introducing a significant discontinuity between the outer surfaces of the first modified offset bracket 300 and the outer surfaces of the modified structural member. Reversing of the modified structural member with respect to the first modified offset bracket 300 will result in a significant protrusion by the (thicker) modified lower longitudinal portion 304 above the surface of the modified structural member and a significant recess by the (thinner) modified upper longitudinal portion 302 in the modified structural member.

Accordingly, use of the first modified offset brackets 300 and the modified structural members significantly lessen the likelihood of improper assembly of any furniture item utilizing the system for assembling modular furniture 10.

It is to be understood that as many of the brackets 42-64, as desired, may include the first modified offset brackets 300. It is possible that all of the brackets 42-64 of the chair 12 (or any other furniture item) may be modified to include the first modified offset brackets 300. It is also possible to include the first modified offset brackets 300 only where it is desired to ensure proper orientation of the structural members 14-36. This would apply if certain of the structural members 14-36 included both finished and unfinished surfaces and it was desirable to ensure orientation of the finished surfaces for proper viewing.

Figure 11:
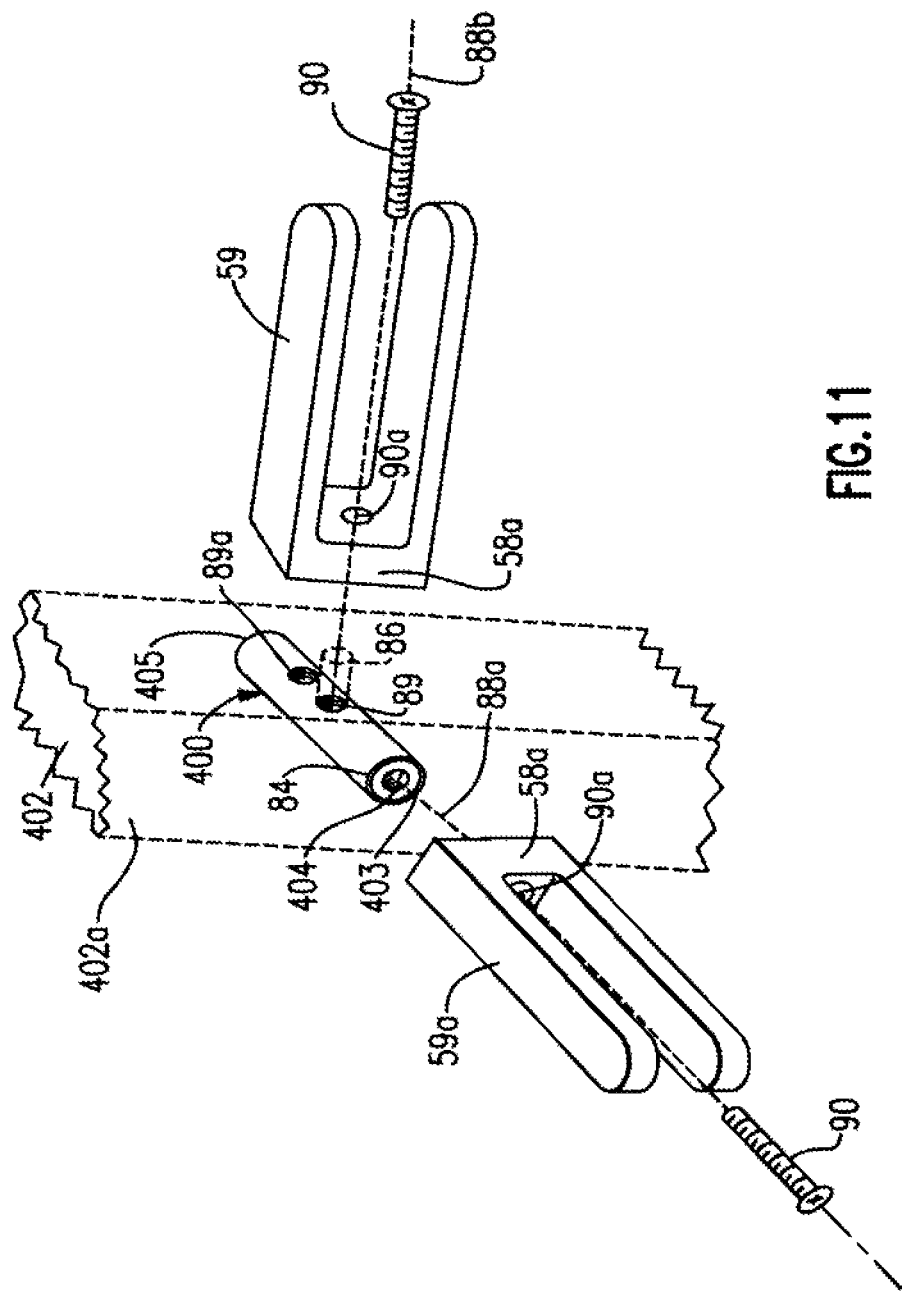
FIG. 11 is an exploded view in perspective of a modified cylindrical pin and two end brackets that attach to the modified cylindrical pin.

Referring now to FIG. 11 is shown a modified cylindrical pin, identified in general by the reference numeral 400. The modified cylindrical pin 400 includes an overall size that is comparable to that of the cylindrical pin 88.

The modified cylindrical pin 400 is disposed inside a thirteenth structural member 402, shown in dashed lines. The modified cylindrical pin 400 is disposed inside the bore hole 84 that is provided in the thirteenth structural member 402.

A first end bracket 59 is attached to the modified cylindrical pin 400 in the same manner as was previously described for attachment of the end bracket 58 to the cylindrical pin 88.

A proximal end 403 of the modified cylindrical pin 400 includes a third tapped hole 404. The proximal end 403 of the modified cylindrical pin 400 is preferably disposed on the same plane (i.e., is flush with or it may be slightly recessed) as a first surface 402a of the thirteenth structural member 402. The modified cylindrical pin 400 includes a center longitudinal axis, as shown by dashed line 88a. The center longitudinal axis of the modified cylindrical pin 400 is perpendicular with respect to a center longitudinal axis of the second tapped hole 89, as shown by dashed line 88b.

It should also be noted that the side hole 86 of the modified cylindrical pin 400 (or of the cylindrical pin 88) can be angled upward or downward, as desired, to provide an upward or downward angle to the first end bracket 59 (or to any of the end brackets 50-64). The side hole 86 is preferably disposed along a center of the thirteenth structural member 402. If desired, the side hole 86 can include a larger inside diameter than is necessary to accommodate the inner machine screw 90. A larger diameter side hole 86 can also be used to provide a desired upward or downward angle to the first end bracket 59 (or to any of the end brackets 50-64).

A second inner machine screw 90 is used to also secure a second end bracket 59a to the modified cylindrical pin 400. The second inner machine screw 90 engages with the inside threads of the third tapped hole 404.

The machine screw 90 that was used to secure the first end bracket 59 to the modified cylindrical pin 400 passes through the side hole 86 and, thereby, secures the modified cylindrical pin 400 in position in the thirteenth structural member 402.

Accordingly, if a force is applied by the second end bracket 59a along a direction of the center longitudinal axis of the modified cylindrical pin 400 attempting to pull the modified cylindrical pin 400 out of the bore hole 84, the modified cylindrical pin 400 is prevented from being dislodged out of the bore hole 84.

The modified cylindrical pin 400 permits the attachment of two structural members (not shown in FIG. 11) at the same location of the thirteenth structural member 402 perpendicular with respect to one-another. An important unexpected benefit is provided because only one bore hole 84 and only one side hole 86 is required to attach two structural members when using the modified cylindrical pin 400. Two bore holes 84 and two side holes 86 would be required to attach two structural members when using the cylindrical pin 88.

By eliminating an additional bore hole 84 and an additional side hole 86 the strength of the thirteenth structural member 402 is improved. The modified cylindrical pin 400 also allows attachment of the two structural members on the same plane (i.e., the same level/elevation). If two of the cylindrical pins 88 were instead utilized, then the two structural members would be offset (i.e., not on the same plane). See, for example, the fifth structural member 22 and the seventh structural member 26 as shown in FIG. 1. An additional benefit is also provided in that the material used to form the modified cylindrical pin 400 (typically a metal although plastic or other materials may be used) provides mechanical support between the first end bracket 59 and the second end bracket 59a.

Accordingly, decreased stress and strain are experienced by the thirteenth structural member 402 when supporting two perpendicular structural members.

The modified cylindrical pin 400 includes a distal end 405. If desired, the distal end 405 is polished and, if exposed, provides a clean smooth surface appearance across the entire surface of the distal end 405. As shown, the distal end 405 is not visible because it is disposed at the bottom of the bore hole 84, which does not extend through the thirteenth structural member 402.

If desired the second tapped hole 89 may be located halfway between the distal end 405 and the proximal end 403, at a center of the modified cylindrical pin 400 (or the cylindrical pin 88). However, a central location of the second tapped hole 89 is generally not preferred for use with the modified cylindrical pin 400. As shown in FIG. 11, the second tapped hole 89 is disposed slightly closer to the proximal end 403 than to the distal end 405.

An auxiliary second tapped hole 89a is preferably included with the modified cylindrical pin 400 and is used when the modified cylindrical pin 400 is rotated so that the distal end 405 is flush (or close to flush) with the first surface 402a of the thirteenth structural member 402. The auxiliary second tapped hole 89a is disposed slightly closer to the distal end 405 than to the proximal end 403.

Because it is generally preferred that the bore hole 84 does not extend entirely through the thirteenth structural member 402 (which limits the overall length of the modified cylindrical pin 400 and also the overall length of the cylindrical pin 88), and because it is generally preferred to locate the side hole 86 in the middle of the thirteenth structural member 402, the second tapped hole 89 is located where desired along the longitudinal length of the modified cylindrical pin 400 to cause the second tapped hole 89 to align with the side hole 86 when the proximal end 403 of the modified cylindrical pin 400 is disposed proximate the first surface 402a of the thirteenth structural member 402.

If the modified cylindrical pin 400 is rotated to dispose the distal end 405 proximate the first surface 402a of the thirteenth structural member 402, the auxiliary second tapped hole 89a is located where desired along the longitudinal length of the modified cylindrical pin 400 to cause the auxiliary second tapped hole 89a to align with the side hole 86. Of course, the second end bracket 59a would not be used if the modified cylindrical pin 400 was rotated 180 degrees because the third tapped hole 404 would be disposed near the bottom of the bore hole 84. The smooth polished distal end 405 would then provide a finished appearance to the bore hole 84.

If desired, the modified cylindrical pin 400 could be further modified (not shown) to include a shorter overall length so that either a modified proximal end (not shown) or a modified distal end (not shown) would be recessed with respect to the first surface 402a of the thirteenth structural member 402. A plug (not shown) would then be inserted into the exposed end of the bore hole 84 to hide (i.e., cover) the exposed end (either the modified proximal end or the modified distal end) of the further modified cylindrical pin.

It is also possible to include a polished end on one longer side of the cylindrical pin 88 and an unfinished end on an opposite shorter length side of the cylindrical pin 88 providing the auxiliary second tapped hole 89a was also included with the cylindrical pin 88. If the shorter unfinished end is inserted into the bore hole 84, the longer polished end would then be flush with the surface of any of the structural members 14-36 and would provide the desired, finished appearance. If a plug were instead desired, the longer polished end would be inserted first into the bore hole 84 and the unfinished shorter end would allow room for later insertion of the plug into the exposed end of the bore hole 84.

Other changes are, of course, also possible that are consistent with the spirit and scope of the invention. For example, if any the brackets 42-64 are formed of a material that is not ideally suited to include screw threads or other fastening means, it is possible to include a threaded insert (not shown) or other type of insert in the brackets 42-64 for that purpose.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A system for assembling modular furniture, comprising:
   a plurality of structural members, each of said structural members including a longitudinal length and a first end and an opposite second end and at least one clearance hole provided through each of said structural members, said at least one clearance hole disposed proximate said first end, or proximate said second end, or proximate said first end and said second end;
   one or more brackets, each of said brackets including at least one upper longitudinal portion and at least one lower longitudinal portion, wherein a first end of said lower longitudinal portion is contiguous with a first end of said upper longitudinal portion, and wherein said lower longitudinal portion is parallel with respect to said upper longitudinal portion, and wherein said lower longitudinal portion is disposed a predetermined distance away from said upper longitudinal portion except at said first end of said lower longitudinal portion and said first end of said upper longitudinal portion, and wherein a gap is provided between said upper longitudinal portion and said lower longitudinal portion except at said first end of said lower longitudinal portion and said first end of said upper longitudinal portion, and wherein at least one hole is provided through said upper longitudinal portion or through said lower longitudinal portion;
   at least one securing aperture disposed in each of said brackets, said at least one securing aperture for securing a distal end of a fastening device to each of said brackets, wherein said at least one securing aperture is disposed in said upper longitudinal portion and positioned to be substantially aligned with each of said at least one hole in said lower longitudinal portion when said at least one hole is positioned in said lower longitudinal portion or said at least one securing aperture is disposed in said lower longitudinal portion and positioned to be substantially aligned with each of said at least one hole in said upper longitudinal portion when said at least one hole is positioned in said upper longitudinal portion;
   wherein, when each of said one or more brackets is sufficiently urged toward said first end or toward said opposite second end of each of said plurality of structural members, said at least one clearance hole of each of said plurality of structural members aligns with said at least one hole and said at least one securing aperture sufficient to permit insertion of said fastening device through said at least one hole and through said at least one clearance hole, and wherein said distal end of said fastening device is able to engage with and cooperate with said at least one securing aperture sufficient to secure each of said one or more brackets to either said first end or said opposite second end of each of said plurality of structural members when said fastening device is sufficiently engaged with said at least one securing aperture;
   wherein said one or more brackets includes an end bracket, and wherein said end bracket includes only one upper longitudinal portion and only one lower longitudinal portion for attachment of an end of one of said plurality of structural members, thereto, and wherein said end bracket includes an end bracket fastening device that extends through an opening provided in a distal end of said end bracket, the end bracket fastening device for attaching said end bracket to another of said plurality of structural members along a longitudinal length of said another of said plurality of structural members; and
   and wherein said another of said plurality of structural members includes a bore hole in said another of said plurality of structural members and a cylindrical pin disposed in said bore hole, and wherein said cylindrical pin includes a second tapped hole that is perpendicular with respect to a center longitudinal axis of said cylindrical pin, and wherein said another of said plurality of structural members includes a side hole that is perpendicular with respect to a center longitudinal axis of said bore hole, and wherein when said cylindrical pin is properly disposed in said bore hole said side hole aligns with said second tapped hole, and wherein when said bracket fastening device is sufficiently tightened, said end bracket is secured to said another of said plurality of structural members along a longitudinal length, thereof.

* * * * *